(12) United States Patent  (10) Patent No.: US 8,744,229 B2
Geens et al.  (45) Date of Patent: Jun. 3, 2014

(54) EQUIPMENT MOUNTING FRAME (75) Inventors: Johan Geens, Bunsbeck (BE); Erik Keustermans, Houwart (BE); Jozef Willekens, Everberg (BE)

(73) Assignee: Tyco Electronics Raychem BVBA, Kessel-Lo (BE)

( * ) Notice: Subject to any disclaimer, the term of this patent is extended or adjusted under 35 U.S.C. 154(b) by 105 days.

(21) Appl. No.: 13/059,936

(22) PCT Filed: Aug. 13, 2009

(86) PCT No.: PCT/GB2009/051017
§ 371 (c)(1),
(2), (4) Date: Feb. 18, 2011

(87) PCT Pub. No.: WO2010/020803
PCT Pub. Date: Feb. 25, 2010

(65) Prior Publication Data
US 2011/0142408 A1  Jun. 16, 2011

(30) Foreign Application Priority Data
Aug. 20, 2008 (GB) .................................. 0815174.8

(51) Int. Cl.
*G02B 6/00* (2006.01)
(52) U.S. Cl.
USPC .......................................... 385/135; 211/208
(58) Field of Classification Search
CPC ............................ G02B 6/4452; G02B 6/4455
USPC ................... 385/135; 211/207, 208
See application file for complete search history.

(56) References Cited

U.S. PATENT DOCUMENTS

| 4,641,754 | A | | 2/1987 | Hebel |
| 4,715,502 | A | * | 12/1987 | Salmon ........................... 211/26 |
| 5,323,916 | A | * | 6/1994 | Salmon ........................... 211/26 |
| 6,129,316 | A | * | 10/2000 | Bauer .......................... 248/68.1 |
| 6,468,112 | B1 | * | 10/2002 | Follingstad et al. .......... 439/719 |
| 6,951,288 | B2 | * | 10/2005 | Henderson ...................... 211/26 |

(Continued)

FOREIGN PATENT DOCUMENTS

CN  1668170 A  9/2005

OTHER PUBLICATIONS

International Preliminary Report on Patentability issued by The International Bureau of WIPO, Geneva, Switzerland, on Feb. 22, 2011 for PCT/GB2009/051017; 8 pages.

(Continued)

*Primary Examiner* — Charlie Peng
(74) *Attorney, Agent, or Firm* — Faegre Baker Daniels LLP (57) ABSTRACT

An equipment mounting frame comprising two side support structures of a selected height, each of which comprises one or more upright members defining a width of that side support structure and a foot structure extending from at least one end of the upright members. The foot structure defining a depth of that side support structure and extending across at least one quarter of the width and carries an upright series or row of fixing members wherein the two side support structures are connectable together at a distance from each other to enable equipment trays or boxes to be mounted in superposed array between the side structures by the fixing members are formed to be nestable together when unconnected to each other for shipment or storage within a volume less than twice the volume defined by width, depth, and height.

16 Claims, 10 Drawing Sheets

(56) References Cited

U.S. PATENT DOCUMENTS

| | | | |
|---|---|---|---|
| 8,330,043 B2* | 12/2012 | Alaniz et al. | 248/68.1 |
| 8,403,154 B2* | 3/2013 | Smith et al. | 211/26.2 |
| 2002/0153335 A1* | 10/2002 | Robideau | 211/26 |
| 2005/0207103 A1 | 9/2005 | Russo | |
| 2006/0198593 A1* | 9/2006 | Ivancevic | 385/135 |
| 2006/0228087 A1* | 10/2006 | Bayazit et al. | 385/135 |

OTHER PUBLICATIONS

International Search Report issued by the European Patent Office on Oct. 21, 2009 for PCT/GB2009/051017.

\* cited by examiner

EQUIPMENT MOUNTING FRAME

This invention relates to frames (also known as racks) for mounting a variety of measuring, musical recording, audio, or telecommunications equipment in an upright array. Important examples of these are the well known telecommunications distribution frames, especially optical distribution frames (ODFs), used to stack trays or boxes of equipment to and from which may be connected electrical wires and cables, or optical fibres and cables. For convenience, the invention will be herein described with reference to telecommunications ODFs, without necessarily excluding its possible uses with other kinds of equipment.

Figure 1:
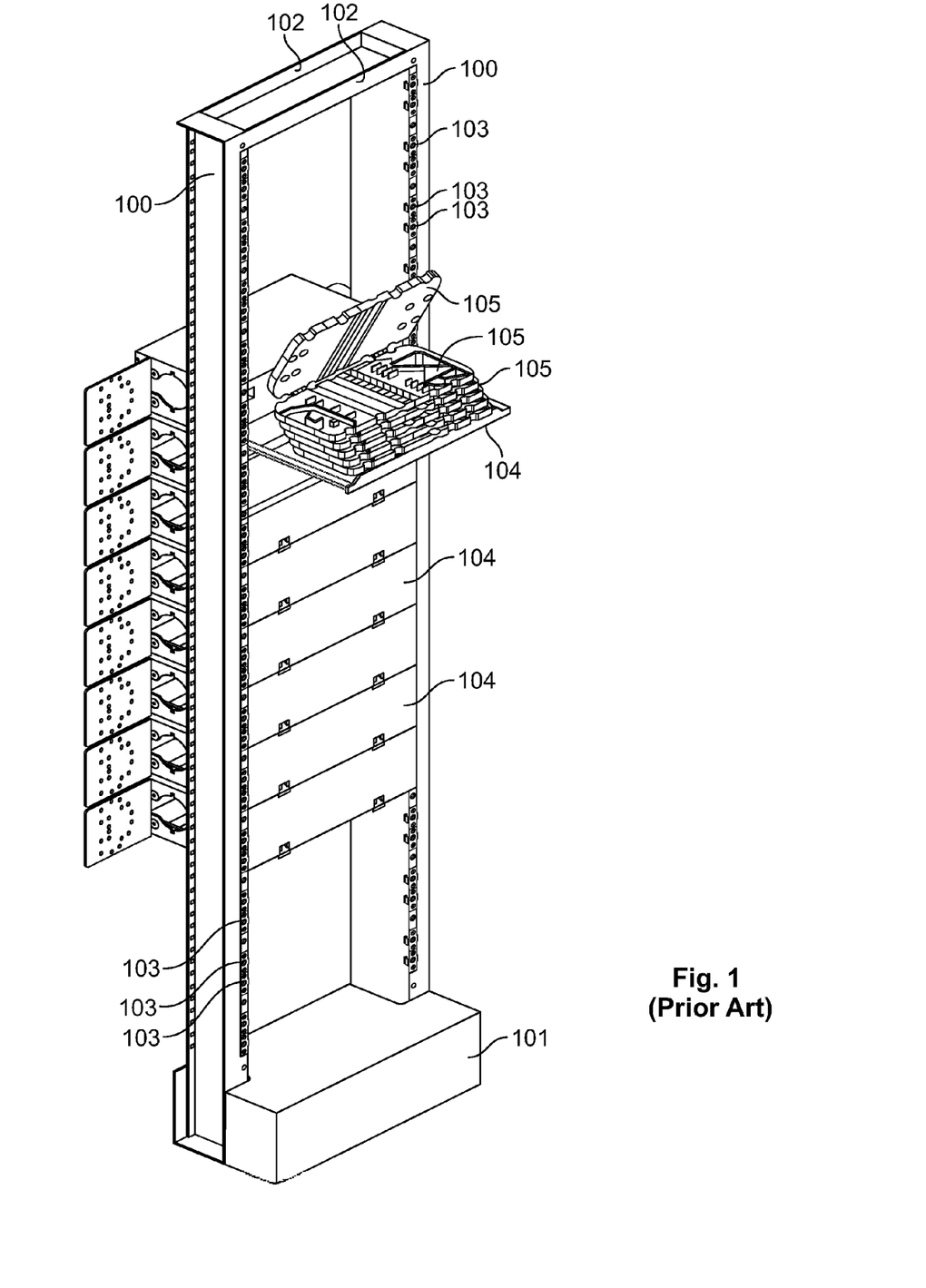

ODFs typically comprise, as shown in FIG. 1 of the accompanying drawings, two upright members 100 held at fixed spacing from each other by a lower floor box 101 and upper cross struts 102. The uprights 100 are equipped with fixing holes 103 at intervals suited to mounting trays or boxes 104 of equipment such as the illustrated slide-out shelf of optical fibre splice trays 105. The equipment trays or boxes 104 are usually bolted to the uprights 100 by means of cage nuts inserted in the selected fixing holes 103.

Figure 2:
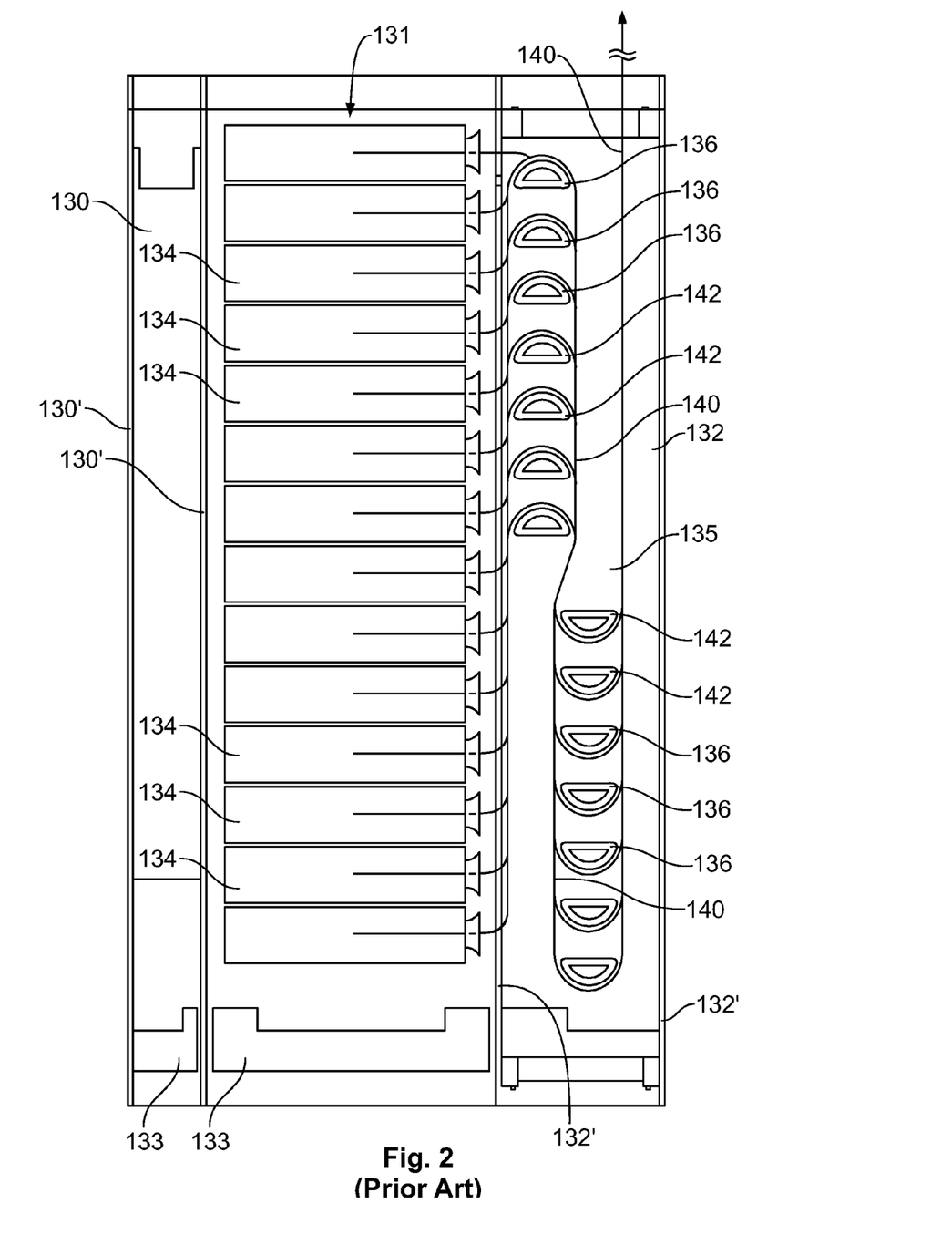

It has been found desirable to provide ODFs with upright side channels 130, 132 on one or both sides of the ODF as schematically illustrated in FIG. 2 of the drawings. These side channels may be used for storing and routing excess lengths of wires or optical fibres 140 extending from the equipment trays or boxes 134 mounted in the main body 131 of the ODF. The terms "wires" and "optical fibres" as used herein are intended to include cables containing multiple wires or optical fibres. Bosses 142 may be provided in the channels to support the excess lengths of wires or optical fibres, and these bosses may have curved surfaces of radius selected to control bending of optical fibres 140 within their allowable range of bending radii. Floor boxes 133 may be included in the side channels as well as in the main body 131 of the ODF.

Figure 3:
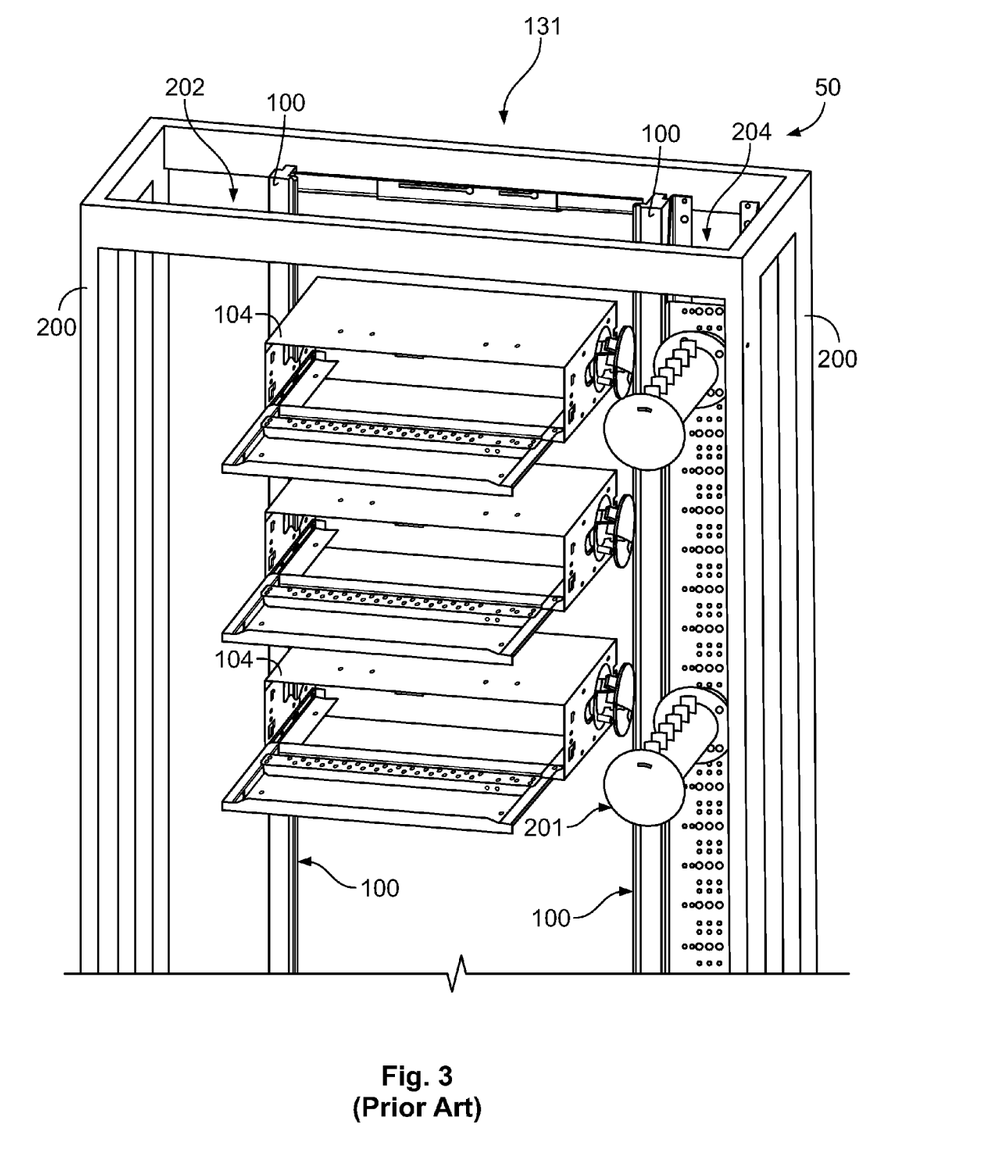

The side channels 130, 132 may be formed by structures 130', 132' attached to the main body 131 of the ODF, as schematically indicated in FIG. 2, or side channels 202, 204 may be enclosed within an expanded support structure 200 as illustrated in FIG. 3, within which expanded structure the uprights 100 of the main body 131 are provided to support the equipment trays or boxes 104. Support bosses 201 are indicated for example in the side channel 204.

Figure 4:
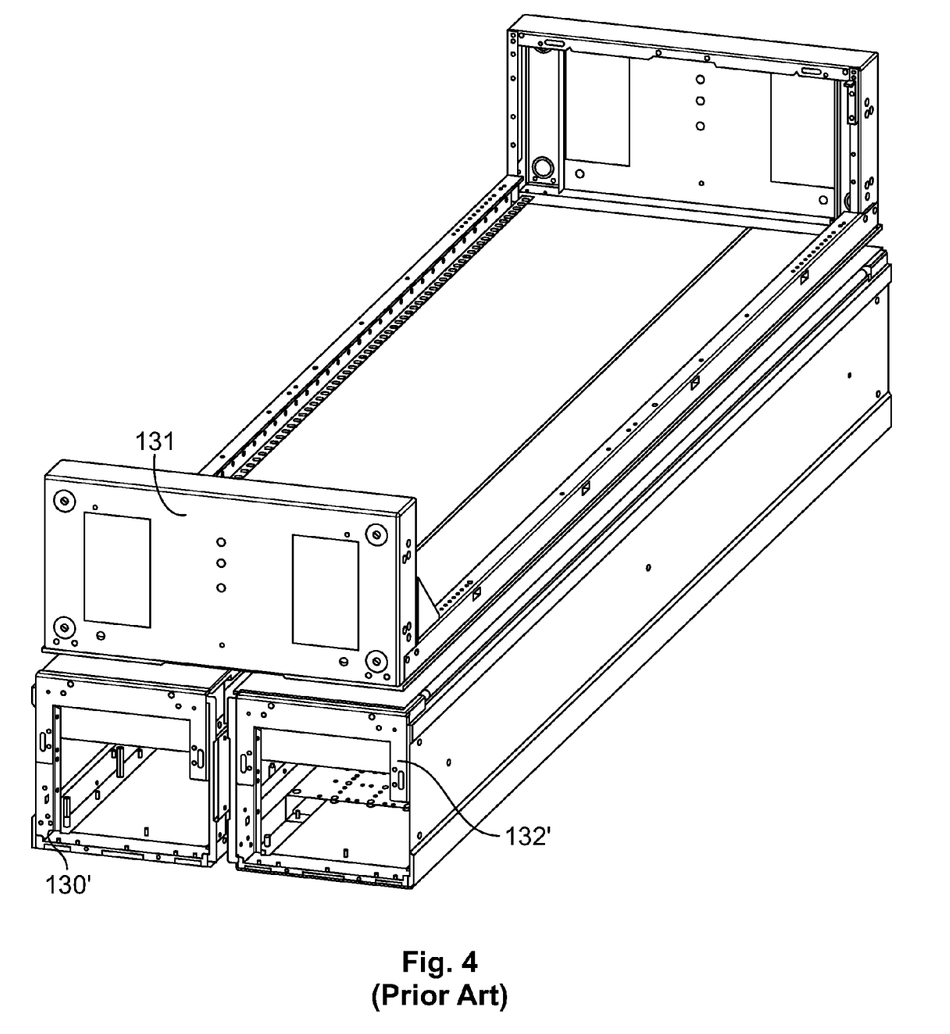

Customers prefer the known frames to be pre-assembled as far as practicable, in order to reduce installation time in the telecommunications distribution centre or other sites where these frames may be used. This involves undesirably bulky packaging and excessive shipping costs, owing to the large proportion of empty space within the pre-assembled racks. This is illustrated for example in FIG. 4 of the drawings, showing the pre-assembled main ODF body 131 packed on top of two pre-assembled side channel structures 130' and 132'.

The present invention improves on the known mounting frames described above by transferring the fixing holes 103 to the side channel structures 130' and 132', which structures can then be nested together for more compact and economical shipping or storage.

The invention accordingly provides an equipment mounting frame comprising two side support structures of a selected height, at least one of which side support structures (a) comprises one or more upright members defining a width of that side support structure, and (b) comprises a foot structure extending from at least one end of the upright member(s), the foot structure defining a depth of that side support structure and extending across at least one quarter (preferably at least half, more preferably at least three quarters, especially preferably substantially all) of the said width, and (c) carries an upright series or row of fixing members, wherein the two side support structures are connectable together at a distance from each other to enable equipment trays or boxes to be mounted in superposed array between the side structures by means of the said fixing members, and wherein the said side support structures are formed to be nestable together when unconnected to each other for shipment or storage within a volume less than twice the volume defined by the said width and depth and height.

In preferred embodiments of the frame according to this invention, the said side support structure has a said foot extending from both ends of the upright member(s). The or each said foot structure is preferably attached at its back edge to the said upright member(s) and has free side and front edges. Side and/or front wall members may be attached to the said side and/or front foot edges when the two side support structures are not nested together, preferably after they are assembled for use. Similarly, back wall members and a front door may be provided to enclose the intermediate space between the side support structures that receives the equipment trays or boxes. It will in many cases be preferred that the two said side structures are similar in size and shape. Each of the said side support structures may carry an upright series or row of the said fixing members, preferably arranged to provide opposed pairs of their respective fixing members, on which opposed pairs the said equipment trays or boxes can be mounted.

Optional body panels can be provided of a size that conveniently packs within the width and length of the nested side channel structures, and simple cross struts can be packed inside the enclosed space for fixing the two side structures together to complete the installation of the frame ready for receiving the equipment trays or boxes. This reduced structure and nested storage and shipping of the frame components according to the present invention advantageously reduces the frame manufacturing and shipping costs, without sacrificing the desirable installation efficiency of pre-assembled frames.

Embodiments of the invention are illustrated by way of example with reference to the accompanying drawings, wherein, FIGS. 1 to 4 schematically show previously known frames as described above.

Figure 5:
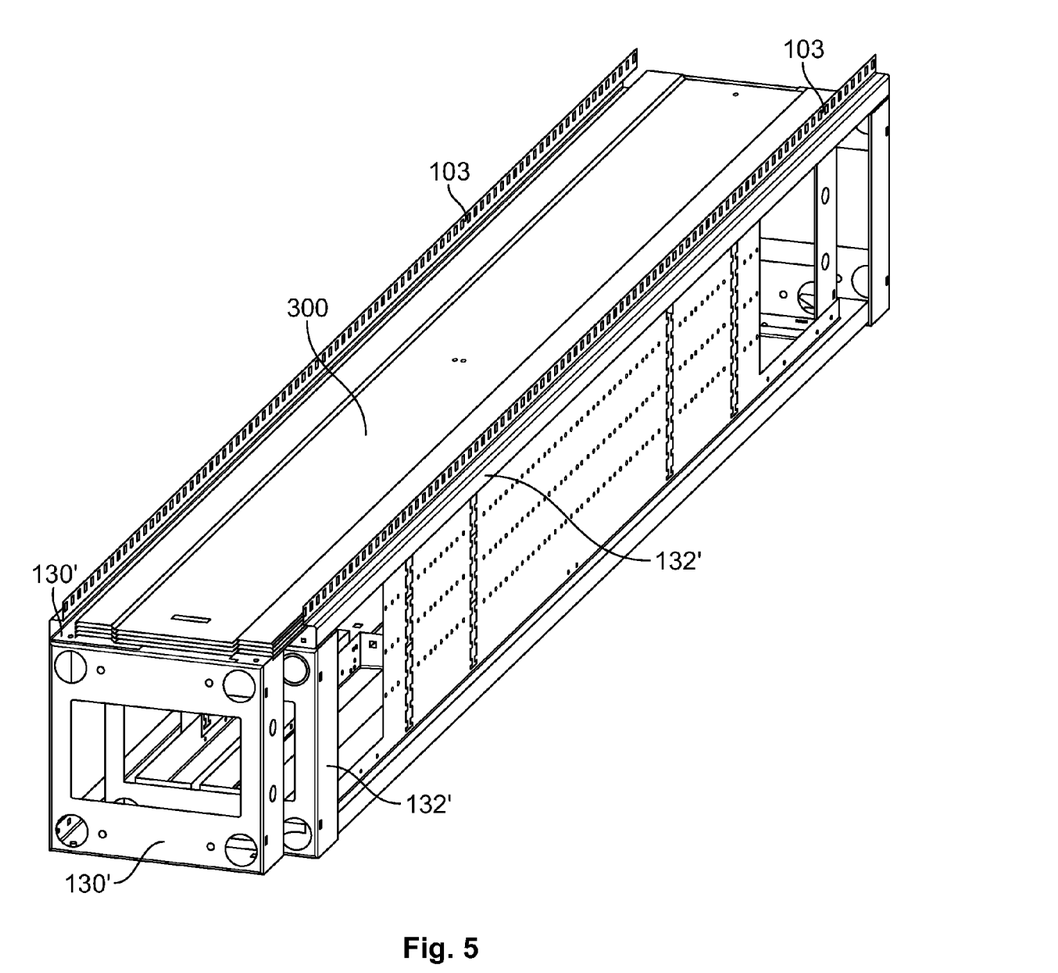
FIG. 5 shows schematically the nested side channel structures of a frame according to the present invention.
Figure 6:
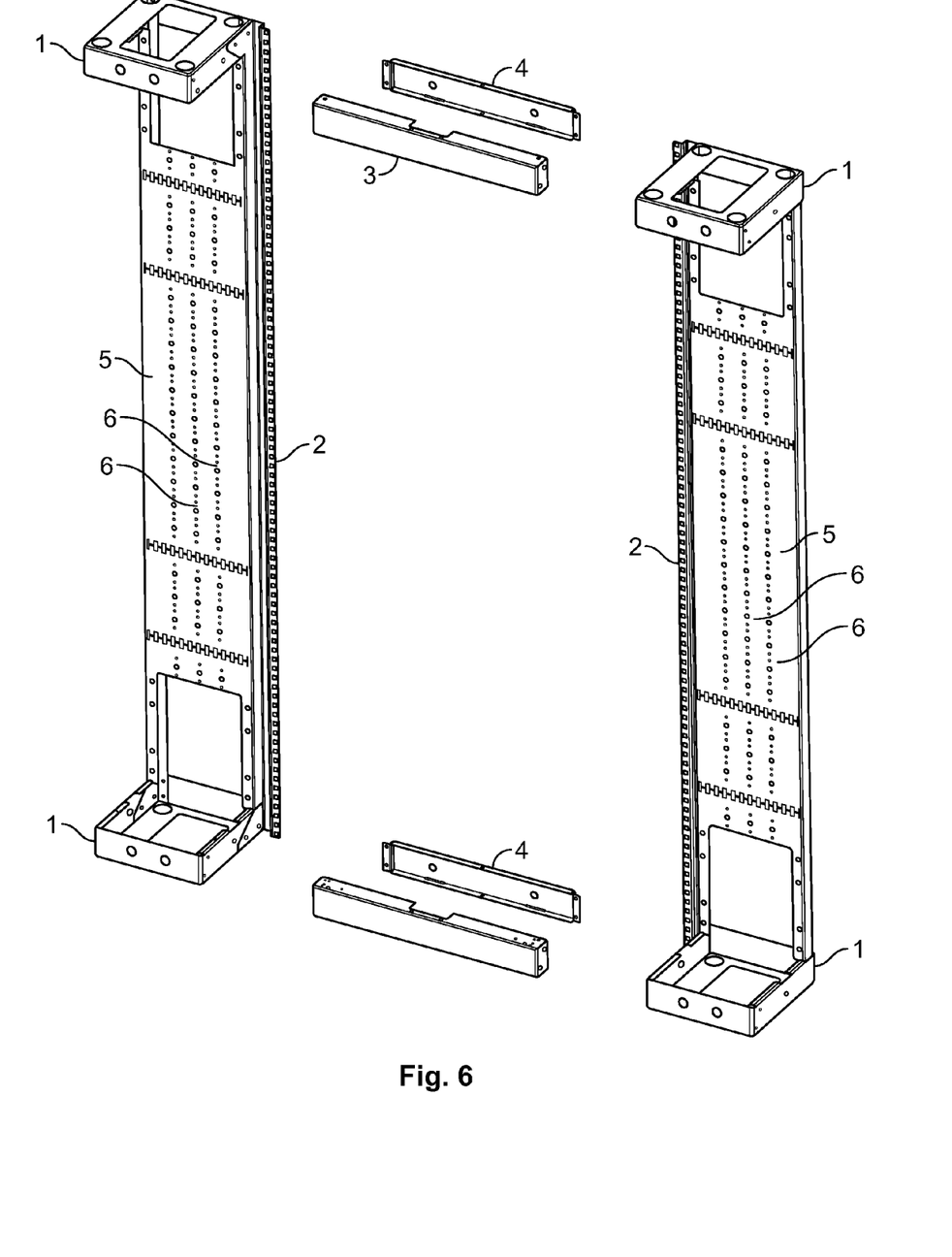
FIG. 6 shows schematically the components of a frame according to the invention.

Referring to the drawings, in FIG. 6 can be seen the two upstanding side channel structures each consisting of top and bottom feet 1 fixed to the opposite ends of upright back members 5 having integrally-attached extensions each containing a row of the fixing holes 2 for mounting equipment trays or boxes. Simple cross struts 3 and 4 are provided for assembling the frame according to the invention with the rows of fixing holes at the required spacing from each other to receive the equipment trays or boxes. Rows of holes 6 are provided in the back members 5 for attaching supports to carry excess lengths of wires or optical fibres as herein described. These frame components may be made of the usual sheet metal, or possibly of other suitably strong materials, for example alloys or engineering plastics. These components and suitable body panels can be advantageously nested together for shipping shown in FIG. 5.

Figure 7A:
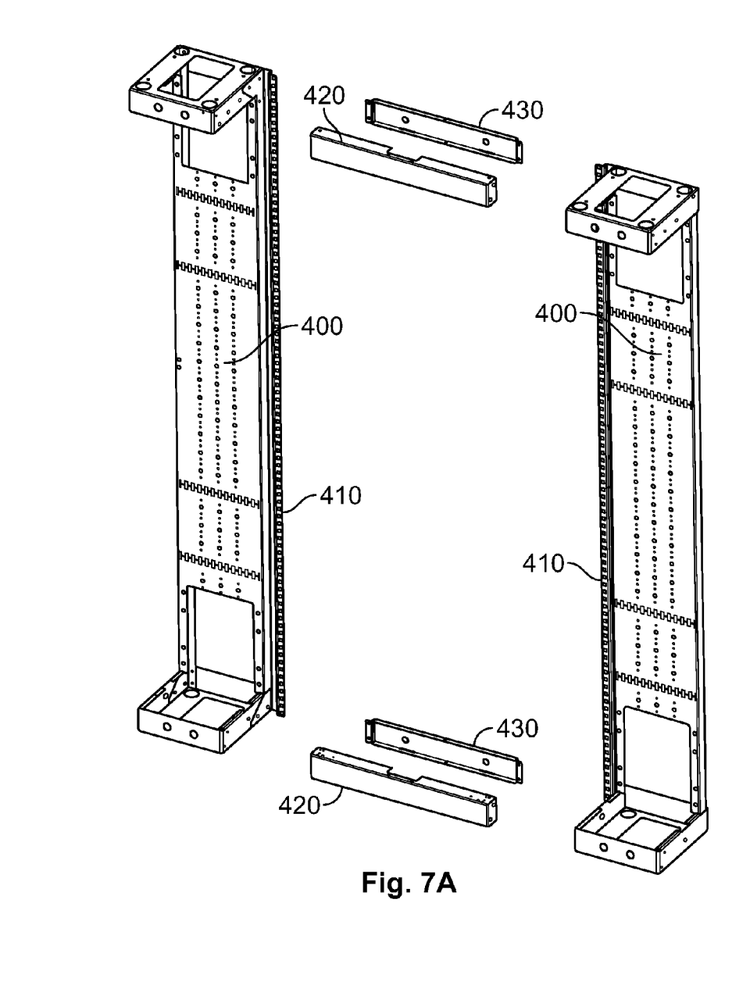
FIGS. 7 and 8 respectively show schematically the stages in assembling a frame according to the present invention in comparison with a previously known frame.
Figure 7B:
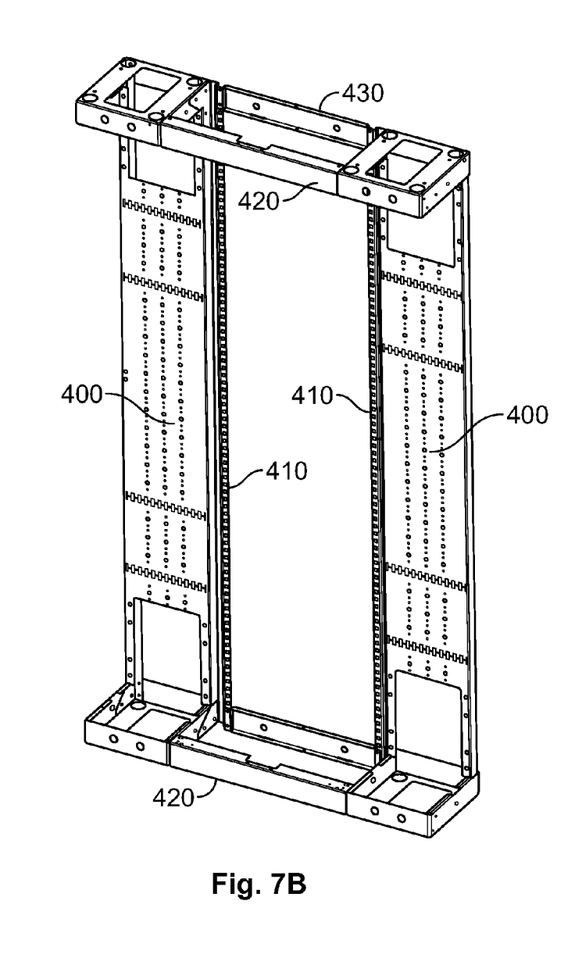
Figure 8A:
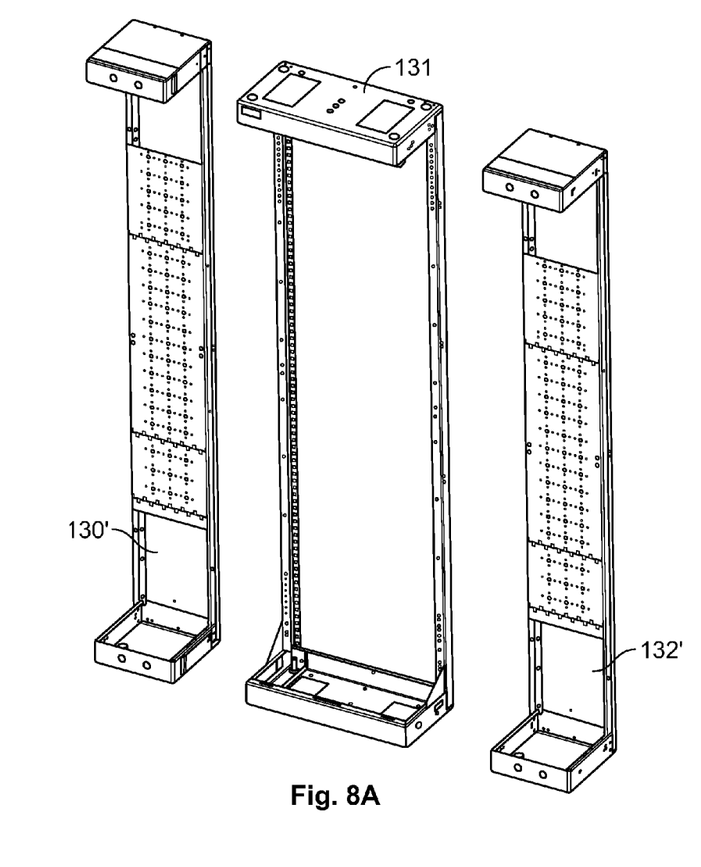
Figure 8B:
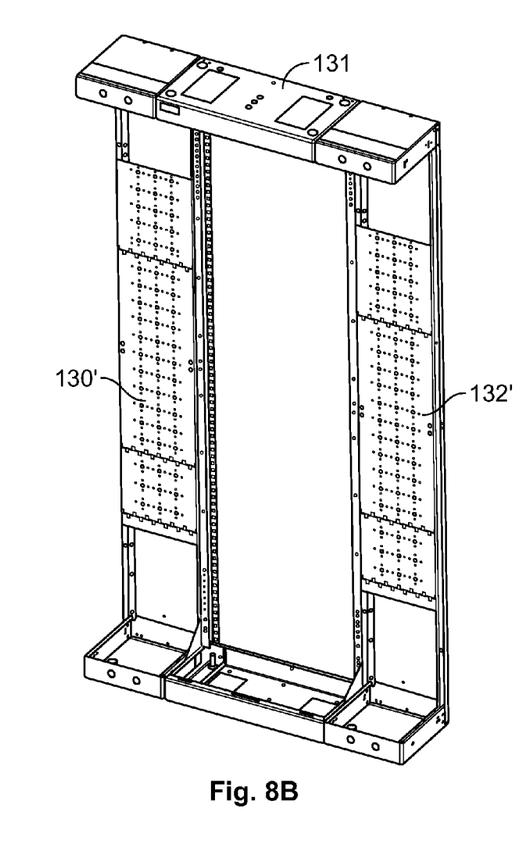

FIG. 7a shows the two side channel structures 400 with rows of fixing holes 410 and the four struts 420, 430 ready for assembling a frame according to this invention; and FIG. 8a shows for comparison the main body 131 of a previously known frame with fixing holes 103 and attachable side channel structures 130', 132'. FIGS. 7b and 8b respectively show the components of FIGS. 7a and 8a assembled together.

Figure 7C:
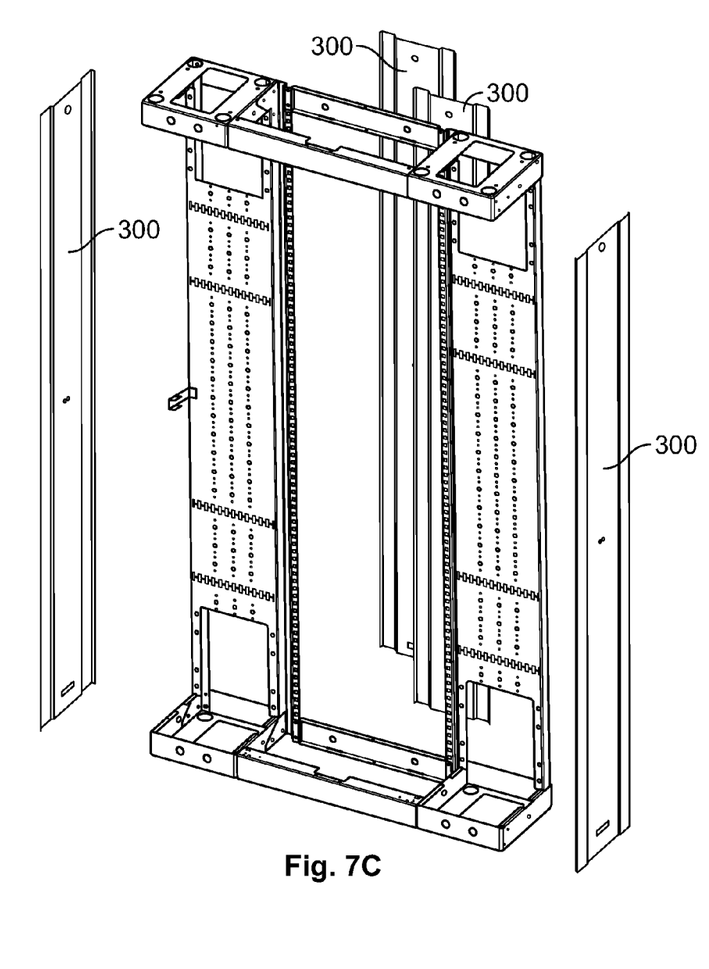

FIG. 7c shows optional body panels 300 of substantially the same width as the side channel structures ready to cover the back and sides of the frame according to this invention.

Figure 8C:
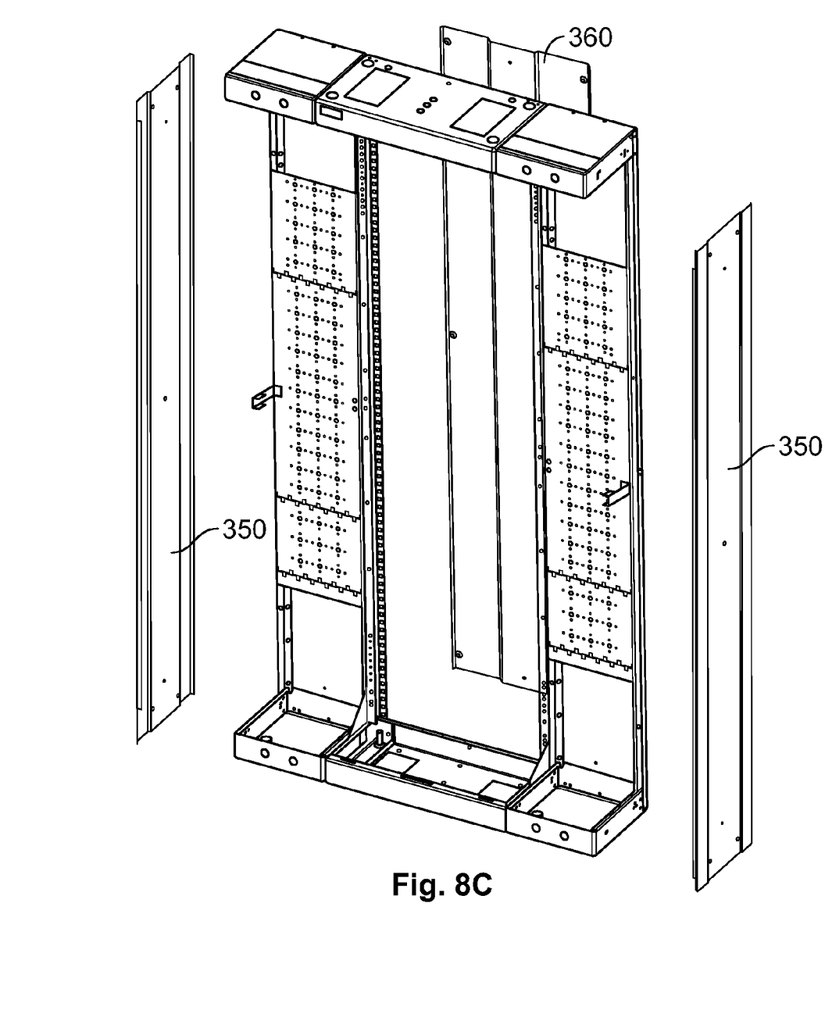

FIG. 8c correspondingly shows side body panels 350 and wider back body panel 360 ready to cover a previously known frame.

Figure 7D:
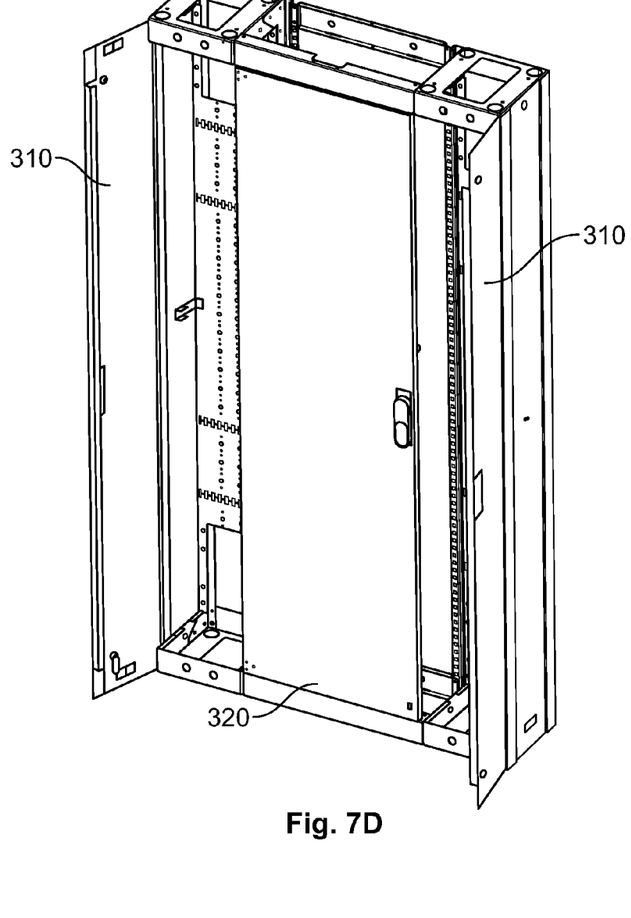
Figure 8D:
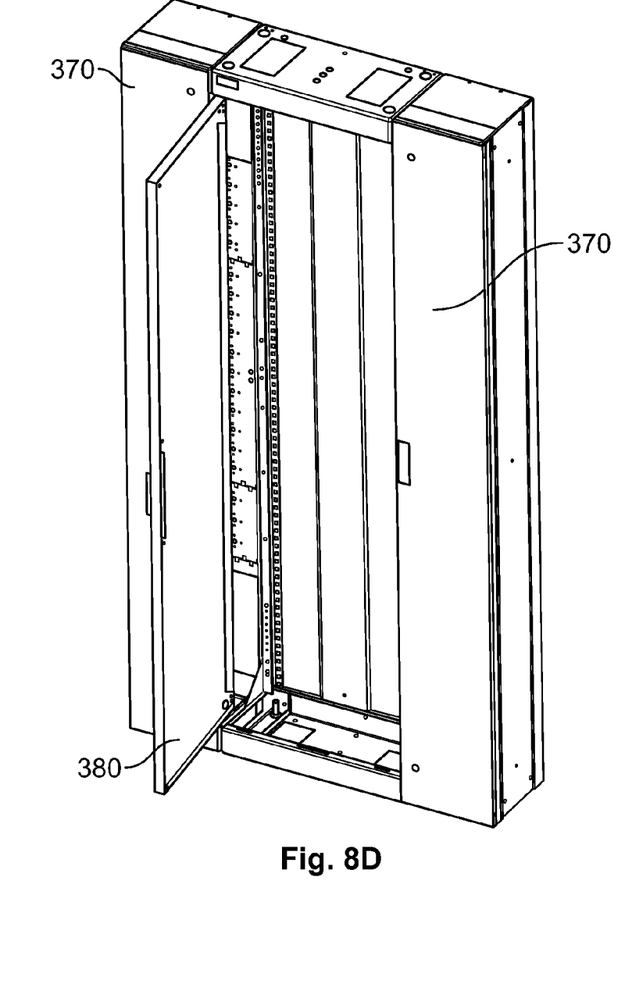

FIGS. 7d and 8d show the respective assembled and covered frames of FIGS. 7c and 8c, with optional openable front side covers 310, 370 and with optional main body doors 320, 380. The doors 320 are wider than the nested side channel components according to the present invention but may be economically shipped as a separate flat pack.

The invention claimed is:

1. An equipment mounting frame comprising two side support structures of a selected height, each of the side support structures
    (a) comprises one or more upright members having back members defining a width of each of the side support structure, each back member defining a forwardly facing surface having rows of holes for attaching supports, and
    (b) comprises a foot structure extending from at least one end of the one or more upright member, the foot structure defining a depth and width of the side support structure and extending across at least one quarter of the width, and
    (c) carries an upright series or row of fixing members, wherein the two side support structures are connectable together by cross struts connectable to the upright series or row of fixing members, the two side supports being connectable in a side by side configuration and at a distance from each other to enable equipment trays or boxes to be mounted in a superposed array between the side structures by means of the upright series or row of fixing members,
wherein each of the side support structures with each of the foot structures extending therefrom are formed to be nestable together when unconnected to each other for shipment or storage within a volume less than twice the volume defined by the width and the depth and the height.

2. A frame according to claim 1, wherein the side support structure has a foot extending from both ends of the upright members.

3. A frame according to claim 1, wherein each foot structure is attached at its back edge to the upright members and has free side and front edges.

4. A frame according to claim 3, wherein side and/or front wall members are attached to the said side and/or front edges when the two side support structures are not nested together.

5. A frame according to claim 1, wherein the two side structures are similar in size and shape.

6. A frame according to claim 1, wherein the side support structures are arranged to provide opposed pairs of their respective fixing members, on which opposed pairs the equipment trays or boxes can be mounted.

7. A frame according to claim 1, comprising struts for connecting the two side support structures together at the distance from each other.

8. A frame according to claim 1, wherein at least one of the side support structures includes support members for supporting excess lengths of conductors connected to the equipment trays or boxes in use.

9. A frame according to claim 1, wherein the fixing members are holes spaced along the series or row at a pitch suitable for mounting the equipment trays or boxes at selected heights when the assembled frame is upstanding.

10. A frame according to claim 9, wherein cage nuts are inserted in at least some of the holes for mounting the equipment trays or boxes.

11. A frame according to claim 1, having the side structures nested together for shipping or storage.

12. A frame according to claim 11, including body panels of width not substantially greater than the width of the side structures, nested with the side structures for shipping or storage.

13. An assembled frame according to claim 1, having trays or boxes of equipment, preferably optical fibre equipment, mounted therein, and having at least one of the side structures supporting excess lengths of wires or optical fibres connected to the said trays or boxes.

14. A telecommunications optical distribution frame according to claim 1.

15. A frame according to claim 1, wherein the foot structure extends across at least one-half of the width.

16. A frame according to claim 1, wherein the foot structure extends across at least three quarters of the width.

* * * * *